Patented Dec. 23, 1952

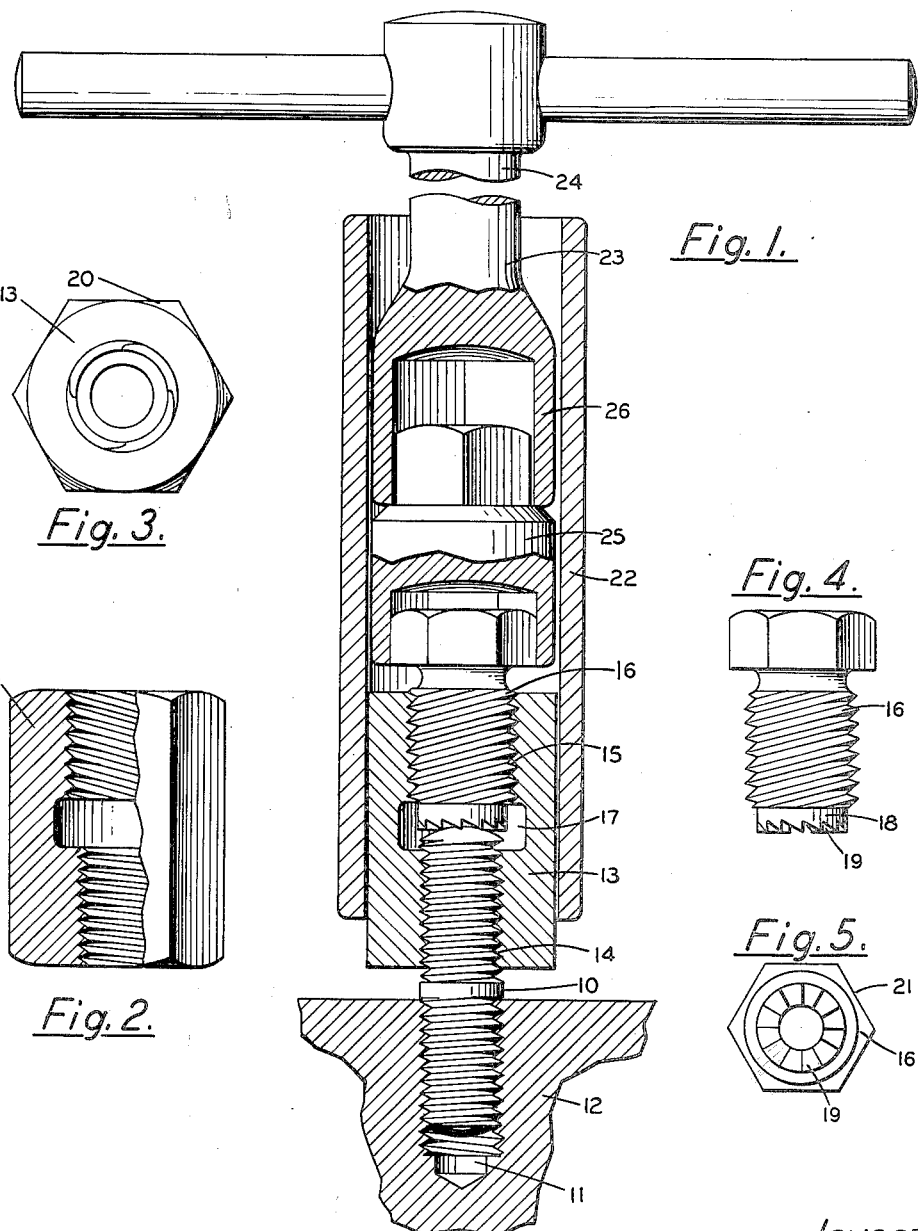

2,622,466

UNITED STATES PATENT OFFICE 2,622,466

STUD REMOVER AND DRIVER

Donald Vanden Bos and Alfred P. Brechting, Grand Rapids, Mich., assignors, by direct and mesne assignments, of one-half to said Vanden Bos and one-half to Leo J. Robinson, Grand Rapids, Mich.

Application April 18, 1949, Serial No. 88,098

2 Claims. (Cl. 81—53)

This invention provides a solution for the very difficult problem which frequently faces the mechanic, namely that of removing threaded studs from any location in which considerable resistance to rotation may have been generated between the stud and the surrounding piece. Such resistance may be due either to an initially tight fit in the threads, or may be caused by corrosion or foreign material which has worked its way into the threaded area. A stud which has been overstrained will also exhibit a considerable resistance to being unscrewed due to the general displacement of its threads with respect to the threads of the surrounding material.

While the problem has been generally recognized, the various approaches that have been made to it have either been unsatisfactory as far as securing the removal of the stud is concerned, or have required mutilation of the same in order to provide an adequate grip with which to generate the required torque. Machinists in general are well aware of the conventional practice of either filing flats upon the side of a stud in order to apply a wrench thereto, or slotting the top of it in order to secure a grip in the same with a screw driver. There are, of course, many situations in which either or both of these practices will not suffice to remove the stud, and both of them render the stud unsuitable for further use. The cost of these items may be considerable, particularly in cases in which the diameters run to an inch or over, and the net amount of metal involved close to a half a pound or more. A mechanic need only throw away a few of these items and the cost involved would equal that of a considerable amount of equipment which might be used in order to salvage them in condition for repeated use.

It has also been proposed to utilize a pair of nuts which may be threaded onto the protruding stud and set one against the other so as to generate a considerable amount of friction to rotation. Having so positioned these nuts, a wrench can then be applied to the same and a stud removed if the resistance to rotation is not excessive. Since there is no jamming action between these members and the thread of the stud, there are limitations as to the amount of torque that can be applied without unscrewing the nuts from the stud rather than the stud from its position in the casting. A combination of a threaded member and some means for preventing relative rotation between the threaded member and the stud has been proposed, the operation of which involves the threading of a collar-shaped member down on the stud, followed by the insertion of a locking device preventing further rotation between these parts. This arrangement also involves the damage to the end of the stud, particularly since the application of a wrench to the collar tends to unscrew the collar from the stud and to weaken the engagement of the locking member and permit a scouring action to take place on the top of the stud.

It may be noted that the driving of the stud initially into its position in a plate or casting is very easily accomplished. All that is necessary is that a socket of some type be provided having some form of abutment disposed to limit the depth to which the stud may be threaded into the socket. Having reached the abutment, further torque operates to drive the stud into engagement with the threads of the hole. The problem arises when it is desired to extract the stud therefrom, and the problem becomes more acute as the torque required increases. If the torque required is not excessive, a couple of nuts can be threaded onto the stud and seized together as outlined above. The two nuts thus locked in position may be used as a handle or a base for the application of a wrench. Since the torque which can be applied to such an arrangement is very limited, other arrangements must be made for the extraction of the stud than those which have been currently available. The present invention provides for the removal by the action of a serrated-end bolt and pair of thread systems having different helix angles and the same "hand." One of these thread systems is adapted to engage the threads of the stud, and the other thread system is formed with the helix angle considerably greater than the first one. A locking bolt is provided which cooperates with the second of the thread systems. Preferably, the two thread systems are formed in the interior of a collar-like member, with the two thread systems coaxial. The threaded portion of the locking bolt is preferably in excess of the length of the thread system in which it operates. The length of the thread system adapted to engage the stud is just sufficient to secure an adequate grip upon the stud in order to transmit the torque required. Preferably, three or four turns should be the minimum in order to secure satisfactory operation. The preferred form of the collar member includes a recess or clearance portion which separates the two thread systems, and the outside of the collar is adapted to receive a wrench or some other similar tool.

The end of the locking bolt which enters into the high-pitch thread system is provided with a locking surface adapted to engage the uppermost end of the stud and prevent relative rotation between the locking bolt and the stud as torque is applied to the collar member in the process of removal. The most satisfactory form for this locking surface has been found to be a series of serrations sufficient in number to generate the required torque without seriously deforming the end of the stud. A completely satisfactory behavior has been found to follow the use of an eight-notch series of serrations. These may be formed after the manner of saw teeth facing in such a direction that they "bite" to the left, since the behavior of the device as unscrewing (lefthand) torque is applied to the collar tends to generate this direction of relative rotation between a right-hand stud and the locking bolt.

The assembly outlined above can be used as a stud driver by inserting the locking bolt and screwing it into position so that the end thereof reaches approximately to the end of the threads having the high helix angle. The assembly thus formed is then screwed on to the stud until the top of the stud contacts the end of the locking bolt. The stud may then be held by the driver assembly, and the torque applied thereto in order to screw the stud into the plate or casting. To remove the driver assembly and leave the stud in position, a few degrees of rotation is given to the locking bolt in the left hand direction. This action serves to disengage the locking bolt from the end of the stud, and permit the unscrewing of the collar from the stud with little resistance. It should be noted that the collar should be held against rotation as the locking bolt is given the few degrees of rotation noted above, or the collar may be given right-hand rotation as the bolt is held. The high helix angle causes the locking bolt to quickly back away from the top of the stud and thereby prevent any scouring or excessive deformation of the top of the stud.

When it is desired to remove a stud which appears to be securely gripped in position, the collar member is first threaded on to the stud until the end thereof is approximately at the end of the thread adapted to receive the same. Holding the collar against further rotation, the locking bolt is then screwed down until it contacts the top of the stud. An added torque is then applied to the locking bolt in order to securely set the locking surface against the top of the stud. With the assembly in this position, left-hand torque can be applied to the collar and the stud unscrewed from its position in the plate or casting. The action of the various components during this operation is very interesting. Since the locking surface prevents relative rotation between the stud and locking bolt, the left-hand torque applied to the collar has a tendency to (a) unscrew the collar from the top of the stud, and (b) cause the locking bolt to move in the direction of the stud. Since the helix angle of the locking bolt threads is in excess of that of the stud threads, the locking bolt tends to move axially faster than the stud and thereby generates a locking or jamming action between the stud and the locking bolt. To accomplish this, it is necessary that the threaded length of the bolt be sufficient to protrude far enough beyond the opening of the collar that no abutments or obstructions should be presented to disturb the jamming action described above. A major part of the torque thus brought to bear on the stud comes from the collar via the high pitch threads and the serrated end of the locking bolt. Since the coefficient of friction between the stud threads and the collar is in most cases greater than the tangent of the helix angle, some of the removing torque may come from thread friction caused as a secondary result of the jamming action (which creates a high loading of these threads). The removal of the stud from the assembled device is surprisingly simple, a few degrees of unscrewing rotation is imparted between the collar and the locking bolt, resulting in the freeing of the locking end of the bolt from the end of the stud. When this has been accomplished, the stud can be easily unscrewed by hand and removed from the collar. It will be noticed that the stud is substantially free from deformity, providing at least three or four threads have been engaged by the collar. Superficial marks on the top of the stud are created by the action of the holding surface, but the deformation is not sufficient to cause any tendency for the stud to expand to the point where it cannot be rethreaded into a normal internal thread and reused.

The preferred form of the collar includes a series of flats conveniently disposed on the outer surface in order to provide for the application of a wrench. These flats may be either a pair of directly opposed surfaces, or may be formed by the usual hexagonal system encountered in bolts and nuts. Similarly, the head of the locking bolt may be formed with a pair of opposed flats, or may be hexagonal. It is also possible to form the head of the locking bolt with a hole diametrically therethrough in order to receive a suitable cross-bar to facilitate the application of torque thereto.

To facilitate the use of these devices in positions surrounded by other machine components, wiring, and the like, it is desirable to form the collar in such a manner that the aforementioned flats are accessible to a tool moving axially into engagement with the same. The usual socket wrench is an example of this type of arrangement, and the present invention provides for a wrench of this general type which is hollow in order to permit a second socket wrench to be inserted therein in order to cooperate with the locking bolt. A stud can be removed from an otherwise inaccessible location by the manipulation of the collar with one extension and the manipulation of the locking bolt with the other.

The various features in the present invention will be discussed in detail by an analysis of the particular embodiments illustrated in the accompanying drawings. In these drawings, Figure 1 illustrates the assembled relationship of a stud threaded into a casting and an assembly of parts embodying the present invention.

Figure 2 shows a section through the collar member of the present invention.

Figure 3 illustrates a top view of the collar member of the present invention.

Figure 4 illustrates a side elevation of the locking bolt.

Figure 5 illustrates a bottom view of the locking bolt showing the serrations at the end thereof.

Referring to Figure 1, the stud 10 is shown in engagement with the threaded hole 11 in the casting 12. The collar member 13 is shown provided with the threaded portion 14 adapted to engage the stud, and the second threaded portion 15 adapted to engage the locking bolt 16.

The clearance section 17 is provided between the two threaded portions 14 and 15. The threaded portion 15 is provided with threads having a helix angle considerably in excess of that of the threaded portion 14. Preferably the locking bolt and its associated threads are quadruple or quintuple in order to secure a sufficiently high helix angle to generate the required locking force and maintain the ease of disassembly characteristic of this device. The locking bolt is provided with an extension 18 adapted to reach beyond the threads of the uppermost threaded portion and engage the top of the stud. The lower extremity of this projection 18 is serrated as indicated at 19, preferably with teeth which "bite" to the left as shown in Figure 4 of the drawings.

The collar 13 is provided with the flats in a hexagonal form as indicated at 20 in order to provide suitable surface for the transmission of torque. Similarly the locking bolt is provided with the flats as indicated at 21 for the same purpose.

For use in close quarters, the extension 22 is provided and adapted to engage the hexagonal outer surface of the collar. The interior of the extension 22 is adapted to engage the flats 20 and transmit torque thereto. The interior of the extension 22 is preferably hollow in order to permit the insertion of a second extension system assembly generally indicated at 23. This assembly includes an extension handle 24, an adaptor plug 25 for the particular size of locking bolt used, and a connecting portion 26 to transmit torque from the handle down to the adaptor.

It is proposed to furnish a set of various collar members and locking bolts adapted for use with a series of stud sizes. These can be assembled in a set similar to the usual tap and die set or case of socket wrenches. As indicated above, such a set can be used either as a stud driver or as a stud remover, and the cost of the studs and time saved through the use thereof will quickly offset the investment made in such equipment.

The particular embodiments which are shown in the accompanying drawings and described herein are for illustrative purposes only and are not to be considered as limitations upon the scope of the appended claims. In these claims, it is the intent of the inventor to claim the entire invention to which he is entitled in view of the prior art.

We claim:

1. A chuck for holding an externally threaded piece comprising: means forming an outer member adapted to receive torque-applying means and having outwardly-opening first and second co-axially disposed communicating internally threaded portions of the same hand fixed with respect to each other with a clearance portion therebetween, said first threaded portion being adapted to receive said externally threaded piece, and said second threaded portion having a helix angle considerably in excess of that of said first threaded portion, and a locking bolt adapted to enter said second threaded portion, said locking bolt having a serrated locking surface for cooperation with the end of said piece to inhibit rotation relative thereto and means for facilitating the application of torque at the opposite end of said bolt from said surface.

2. A wrench for applying torque to an externally threaded piece, comprising: means forming a member having outwardly-opening first and second co-axially disposed communicating internally threaded portions of the same hand fixed with respect to each other, said first threaded portion being adapted to receive said externally threaded piece, and said second threaded portion having a helix angle considerably in excess of that of said first threaded portion; a locking bolt adapted to enter said second threaded portion, said locking bolt having a locking surface for cooperation with the end of said piece to inhibit rotation relative thereto and means for facilitating the application of torque at the opposite end of said bolt from said surface; and co-axial extension means for applying torque to said internally threaded member and to said bolt.

DONALD VANDEN BOS.
ALFRED P. BRECHTING.

REFERENCES CITED

The following references are of record in the file of this patent:

UNITED STATES PATENTS

| Number | Name | Date |
|---|---|---|
| 801,767 | Cleveland | Oct. 10, 1905 |
| 1,281,438 | Tuttle | Oct. 15, 1918 |
| 1,298,324 | Funk | Mar. 25, 1919 |
| 1,549,041 | Berg | Aug. 11, 1925 |
| 1,566,691 | Perry | Dec. 22, 1925 |
| 1,785,847 | Valentine | Dec. 23, 1930 |
| 1,813,424 | Roche | July 7, 1931 |
| 2,281,164 | Maling | Apr. 28, 1942 |

FOREIGN PATENTS

| Number | Country | Date |
|---|---|---|
| 346,351 | France | Nov. 1904 |